(12) United States Patent
Halimi (10) Patent No.: US 10,962,402 B1
(45) Date of Patent: Mar. 30, 2021

(54) LOW POWER CONSUMPTION TOILET TANK LEAK DETECTION DEVICE

(71) Applicant: Flo Technologies, Inc., Culver City, CA (US)

(72) Inventor: Henry M. Halimi, Los Angeles, CA (US)

(73) Assignee: Flo Technologies, Inc., Culver City, CA (US)

( * ) Notice: Subject to any disclaimer, the term of this patent is extended or adjusted under 35 U.S.C. 154(b) by 0 days.

(21) Appl. No.: 16/948,246

(22) Filed: Sep. 9, 2020

Related U.S. Application Data (60) Provisional application No. 62/900,426, filed on Sep. 13, 2019.

(51) Int. Cl.
*E03D 9/00* (2006.01)
*G01F 23/62* (2006.01)

(52) U.S. Cl.
CPC ............. *G01F 23/62* (2013.01); *E03D 9/00* (2013.01)

(58) Field of Classification Search
CPC .............. E03D 1/00; E03D 9/00; G01F 23/62
See application file for complete search history.

(56) References Cited

U.S. PATENT DOCUMENTS

10,214,889 B2   2/2019   Brackett et al.
10,385,559 B2   8/2019   Canfield et al.

*Primary Examiner* — Christine J Skubinna
(74) *Attorney, Agent, or Firm* — Hackler Daghighian Martino & Novak (57) ABSTRACT

A low power consumption leak detection device for a toilet tank includes a water level switch disposed within the toilet tank having a float. The float moves with a water level within the toilet tank from a starting position to a lower position. An electronic circuit is configured to be electrically disconnected from a power source when the float is in the starting position. The electronic circuit is configured to be electrically connected to the power source when the float is in the lower position and activate a timer having a preset time limit, which if reached sends an alarm signal to an alarm indicator. The alarm indicator notifies a resident of a potential water leak problem that can be fixed. The lower power consumption leak detection device only uses power when the water level drops thereby greatly extending the life of the battery and usefulness of the device.

20 Claims, 9 Drawing Sheets

FIG. 3A
(OPEN)

FIG. 3B
(CLOSED)

LOW POWER CONSUMPTION TOILET TANK LEAK DETECTION DEVICE

CROSS-REFERENCE TO RELATED APPLICATIONS

This non-provisional application claims priority to provisional application 62/900,426 filed on Sep. 13, 2019, the entire contents of which are hereby incorporated in full by this reference.

DESCRIPTION

Field of the Invention

The present invention generally relates to leak detection of a toilet tank. More particularly, the present invention relates to a low cost and low power consumption device for toilet tank leak detection.

Background of the Invention

Water consumption studies and data clearly indicate that a majority of the water wasted in dwellings are due to toilet leaks and malfunctions thereof. These leaks mostly go unnoticed because the wasted water goes down the drain and also because many times toilets are unattended for long periods of time.

Unless the toilet is flushed or the tank loses water due to leaks, the water level in the toilet tank should remain at a full level. It is advisable for the toilet installer or resident to set the toilet fill level to a level which is below the overflow line otherwise the toilet fill valve will continue filling the toilet tank with water which will end up being flushed through the toilet bowl resulting in wasted water and cost.

However, even when such toilet fill levels are properly set, over time problems may develop. For example, toilet fill valve adjustments occasionally change while in service due to age, water quality and minerals, environmental conditions or exposure to excessive water pressure. There are at least three major types of leaks in toilet tanks that account for almost all the water waste.

First, small leaks may develop from multiple sources such as cracks in the body of the tank, a leaky flapper may drip water in the toilet bowl, or leaks may develop from broken seals and the like. A decline in water level in toilet tanks due to such leaks are usually at relatively much slower decline rate than that of a toilet flush which makes identifying them even harder. Second, the flapper may simply be stuck in the open position and not noticed by the resident. In this situation the fill valve is constantly trying to fill the toilet tank only to have the water flush right through the toilet bowl. Third, there may be an overfill situation due to a loss of original fill valve settings or malfunction. For example, the toilet fill valve may fail to operate over time such that water is always being introduced into the toilet bowl despite the toilet tank being full. In this situation, water is flushing through the overflow tube and being wasted yet again. Accordingly, there is a need for a device that can notify the user of the presence of such situations. Certain devices attempt to address this situation but suffer a number of other drawbacks, for example, having a short life span, consuming large amounts of power, and/or other drawbacks not discussed.

Accordingly, there is a need for a low power consumption toilet tank leak detection device. The present invention fulfills these needs and provides other related advantages.

SUMMARY OF THE INVENTION

An exemplary embodiment of the present invention is a low power consumption toilet tank leak detection device 30 as disclosed herein. The leak detection device 30 is intended to be used for a toilet tank 31, but could be used in other tanks. A support structure 32 is configured to secure the leak detection device relative to the toilet tank. A water level switch 28 is attached to the support structure configured to be disposed within the toilet tank. The water level switch comprises a float 23 configured to be buoyant when placed upon a water source. The float is configured to float upon and at least partially move with a water level 25 within the toilet tank from a beginning position 24 to a first non-beginning position 26/27, the first non-beginning position being lower or higher in relation to the beginning position. An electronic circuit 39 is attached to the support structure. The electronic circuit includes a power source 41 and a timer 40, wherein the electronic circuit is in electrical communication with the water level switch. The electronic circuit is configured to be electrically disconnected from the power source when the water level switch is at the beginning position. The electronic circuit is configured to be electrically connected to the power source when the water level switch is at the first non-beginning position. The timer is configured to be activated when the water level switch is at the first non-beginning position and the electronic circuit is electrically connected to the power source. The timer includes a preset time limit, wherein if the preset time limit is reached and/or exceeded the electronic circuit is configured to send an alarm signal to an alarm indicator 42. Other exemplary embodiments of the present invention are now further discussed herein below.

The support structure may be formed as or includes a bracket 32, the bracket configured to secure the leak detection device to the toilet tank or to an overflow tube inside the toilet tank.

The timer may include a second preset time limit, wherein if the second preset time limit is reached and/or exceeded the electronic circuit is configured to disconnect from the power source. The second preset time limit may start when the first preset time limit is reached and/or exceeded.

Alternatively, another embodiment of the present invention may be configured to automatically disconnect electrical power to the electronic circuit after the alarm signal has been sent, such that a second preset time limit is not needed.

The alarm indicator may be attached to the support structure, where the alarm indicator is configured to be disposed at least partially outside the toilet tank. The alarm indicator may include a visual alarm 45/48, wherein the visual alarm may comprise an LED 45 and/or wherein the visual alarm may comprise a mechanical display 48 (such as a reset button that pops up) configured to remain displayed even when the power source is disconnected from the electronic circuit.

The alarm indicator may comprise a speaker 44 (buzzer) configured to sound an audible alarm.

The alarm indicator may comprise a transmitter 54, wherein the transmitter is configured to receive the alarm signal and send a wireless alarm signal to an electronic device, such as a smart phone or computer. In such embodiments, the alarm indicator may be configured to be fully disposed within the toilet tank.

The power source 41 may be a battery, such as a rechargeable battery or a non-rechargeable battery. Alternatively, the power source may be hard wired to an electrical outlet in the dwelling or come from solar power.

In one embodiment, the water level switch 28 may comprise a vertically oriented support 20 including a reed switch 14 having a longitudinal axis 29 aligned along a longitudinal length 19 of the vertically oriented support. The float may be movable up and down along the vertically oriented support, wherein the float comprises a ring magnet 10. The ring magnet comprises a north-pole ring portion N abutting a south-pole ring portion S, where a central axis 12 of the ring magnet is aligned with the longitudinal axis 29 of the reed switch 14.

The vertically oriented support may include a lower stop 27 configured to prevent the float from moving below the lower stop when the water level within the toilet tank drops further below, wherein the float abutting the lower stop is located at the first non-beginning position.

The float may be configured to float upon and at least partially move with the water level within the toilet tank from the beginning position to a second non-beginning position 26, the second non-beginning position being higher in relation to the beginning position.

The vertically oriented support may include a higher stop 26 configured to prevent the float from moving above the higher stop when the water level within the toilet tanks rises further above, wherein the float abutting the higher stop is located at the second non-beginning position.

The vertically oriented support 20 may be adjustable up and down in relation to the support structure, through the use of a screw 36 with knurled head 37 or the like, where the support 20 can be adjusted to move within a passageway 35.

In one embodiment, the electronic circuit may include a counter 57, where the counter is configured to display how many times the leak detection device was activated. The counter may include a counter reset button 58, where the counter reset button is configured to reset the counter back to a starting count when activated.

In the embodiment shown, the leak detection device does not include a microprocessor, and, in other embodiments not shown, a microprocessor might be used.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1A:
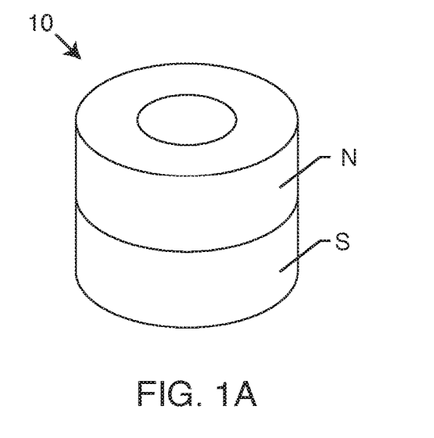
FIG. 1A is a perspective view of an axially magnetized ring magnet.
Figure 1B:
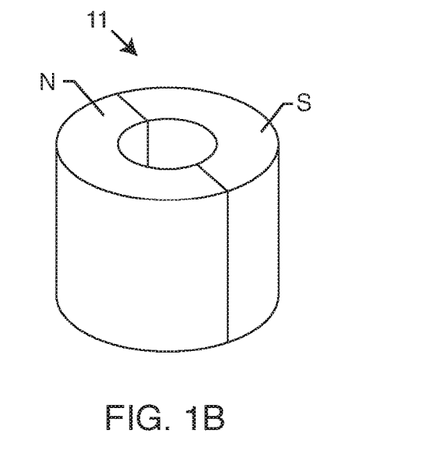
FIG. 1B is a perspective view of a diametrically magnetized ring magnet.

An embodiment of the present device utilizes a ring magnet and a reed switch, therefore a discussion of these components is appropriate at the beginning of this detailed description. Typically, there are two types of ring magnets, where the first type of ring magnet 10 is axially magnetized and is shown in FIG. 1A. One can see the north-pole being labeled as N and the south-pole being labeled as S. The second type of ring magnet 11 is diametrically magnetized and is shown in FIG. 1B. One can see how the magnetization poles are perpendicular to that of FIG. 1A. In FIG. 1B the left half is labeled N for the north-pole and the right half is labeled S for the south-pole. Each of these types of ring magnets produce different magnetic fields due to the different orientation of the poles. The ring magnet type used in the embodiments discussed and shown herein is the axially magnetized ring magnet of FIG. 1A.

Figure 2:
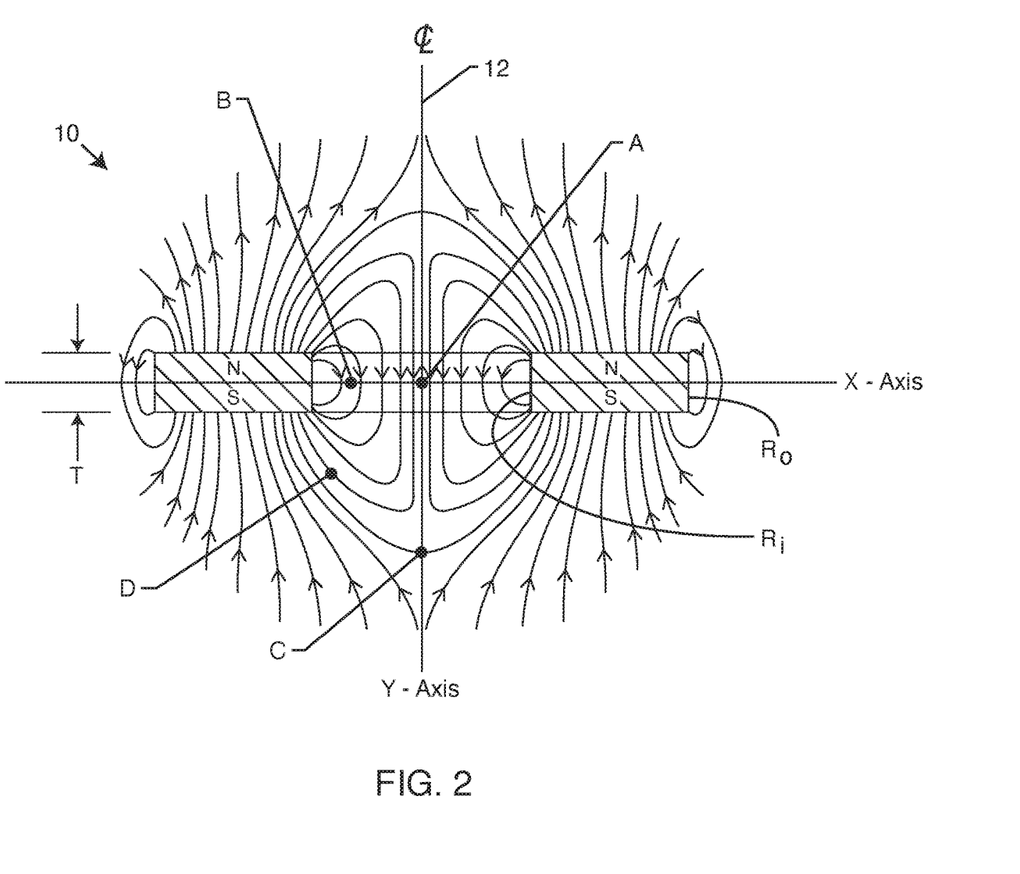
FIG. 2 is a sectional view through an axially magnetized ring magnet showing the magnetic field lines.

FIG. 2 illustrates a cross sectional side view through an axially magnetized ring magnet 10 now showing the magnetic field lines. An x-axis and y-axis are also shown, the center of which corresponds to the center of the ring magnet 10. The y-axis is also the central axis 12 (centerline) of the ring magnet 10. One can see how the magnetic field lines form a loop at the radius ends of the ring magnet with field lines escaping outwardly from the middle portion of the ring magnet.

Notably there is a transition field line (location C) where the looping field lines change to outwardly extending field lines. It is understood by those skilled in the art that the line designating the transition field line where the magnetic field changes from either curving inward or outward is nothing but an imaginary location and not an actual field line, as otherwise a north field line would be coupling with itself. Rather, this transition field line is drawn for the reader's understanding such that they understand there is a location of transition between the various field lines.

Location A is the intersection of the x-axis and y-axis. One can see that the magnetic field lines going from north to south are downwardly aligned along the y-axis. All field lines in the x-axis are effectively cancelled out or non-existent. As the ratio of the inside radius Ri to the outside radius Ro increases the width of the magnetic field in the direction of the y-axis increases. As the thickness T increases the length of the magnetic field in the direction of the y-axis increases. In other words, the direction of the magnet field becomes less linear as the location moves from the intersection of the x-y axis towards the inner surface of the ring magnet along the x-axis as noted by location B. This characteristic further changes as the relevant location moves up or down from the x-axis as noted by location C. Also, this characteristic further changes as the location moves up or down the x and y-axis as shown at location D. Importantly, as shown at location C, the direction of the magnetic field becomes radically different and are almost at 90 degrees to the field direction in comparison to location A. An embodiment of the present invention utilizes this transition field line at location C to activate the reed switch, which is now further discusses herein.

Figure 3A:
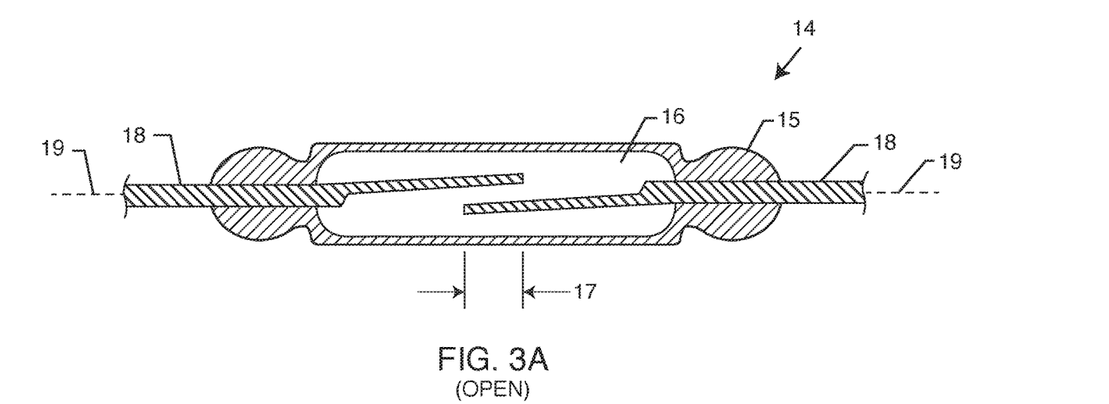
FIG. 3A is a sectional view of a reed switch in the open position.

As shown in FIG. 3A, a reed switch 14 has a glass capsule 15 with an inert gas 16 located within. There is a small gap between the overlap 17 of two ends of the reed blades 18. The reed switches are linear in length and define a longitudinal axis 19. Reed switches 14 are simple mechanical devices that are available in Normally Open (NO), Normally Closed (NC) (2 wire) or NO/NC (3 wire) combination. They change from a default position to the opposing position when placed in a magnetic field that causes the contacts in the switch engage or disengage, which does depend upon the specification and sensitivity of a particular reed switch.

Figure 3B:
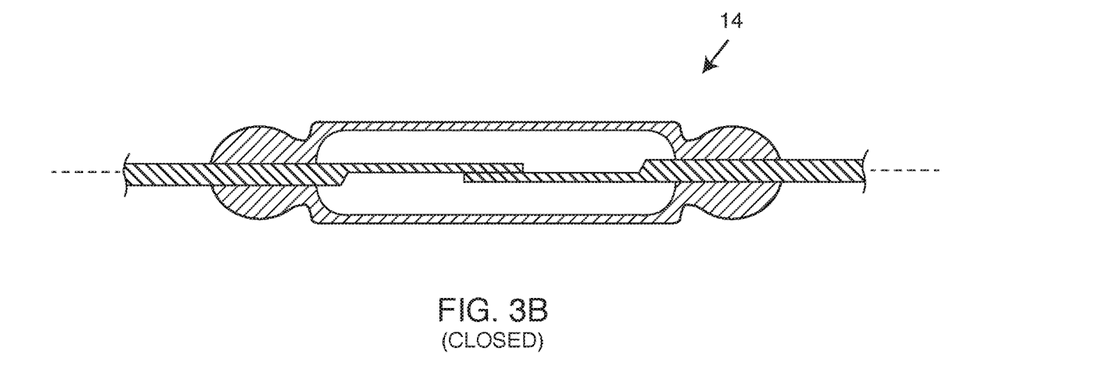
FIG. 3B is a sectional view of the reed switch of FIG. 3A in a closed position.
Figure 4A:
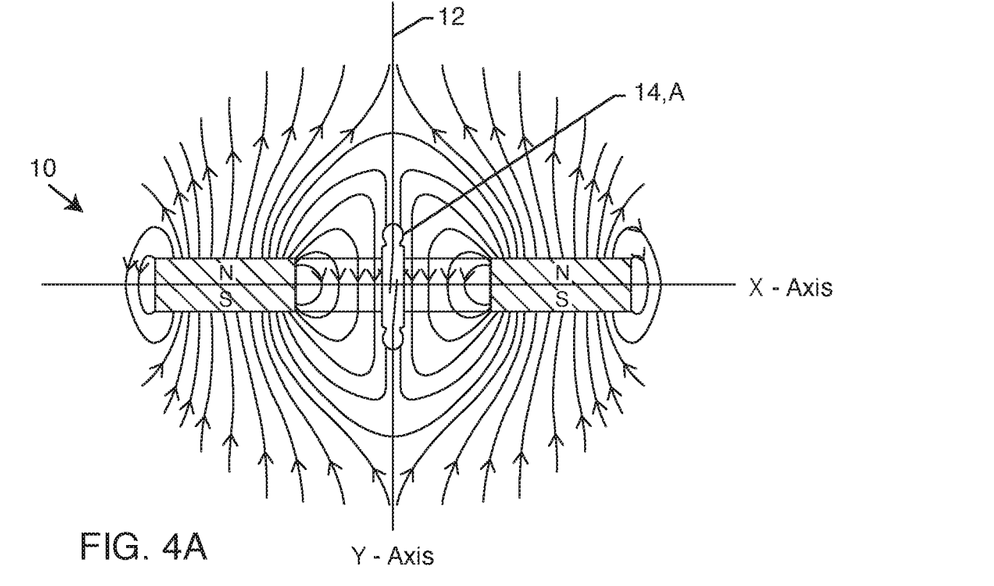
FIG. 4A is a sectional view of the structures of FIGS. 2 and 3A combined, where the reed switch is disposed at the center of the ring magnet and therefore is open.
Figure 4B:
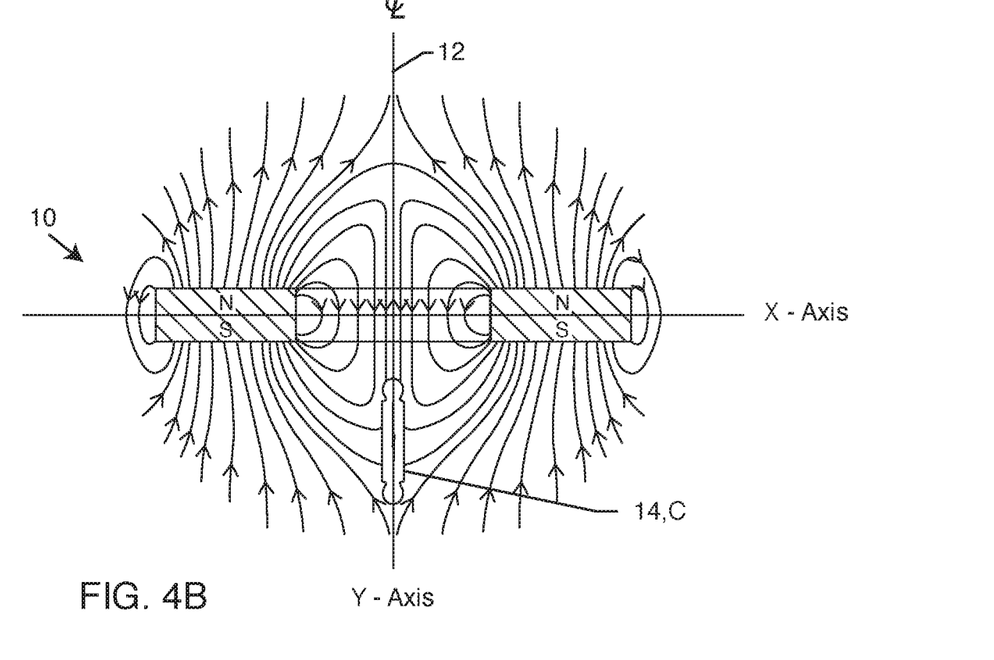
FIG. 4B is a sectional view of the structures of FIGS. 2 and 3B combined, where the reed switch is disposed below the center of the ring magnet and therefore is closed.

A reed switch's response to a magnetic field depends on the magnetic strength and direction of the magnetic field relative to the position of the switch contacts. If the magnetic fields are in the same direction as the switch reeds, the reed switch would not react as shown in FIG. 3A. For example, if the reed switch was aligned along the y-axis at location A in FIG. 2, the reed switch will not react (not close) as is shown in FIG. 4A. On the other hand, if the magnetic field lines are running non-parallel (i.e. close to perpendicular) to the reed switch, the reed switch will close as shown in FIG. 3B. For example, if the reed switch 14 was aligned along the y-axis at location C in FIG. 2, the reed switch will close as shown in FIG. 4B.

As can now be appreciated, it is possible to create a linear magnetic field in the direction of y-axis in center of the ring magnet. The width and length of the linear magnetic field depends on the inner radius, outer radius, length and material of the magnet. By designing a magnet that accommodates the size, shape and required magnetic force of a reed switch, the reed switch can be placed in the center of the magnet in a position that it will not attract the switch reeds to each other because the magnetic field will run along the metallic reeds without any lateral magnetic force to make a contact. If the reed switch is moved closer to an inner wall, the magnetic fields will change pattern and will no longer be linear hence will trigger the switch. However, one can create a structure which centers the ring magnet about the reed switch such that almost no movement in the x-axis is allowed. Then, as the reed switch moves along y-axis away from the center of the magnet, the reed switch will trigger because the magnetic fields become non-linear, hence triggering the switch at location C in FIG. 2 and also shown in FIG. 4B.

Figure 5:
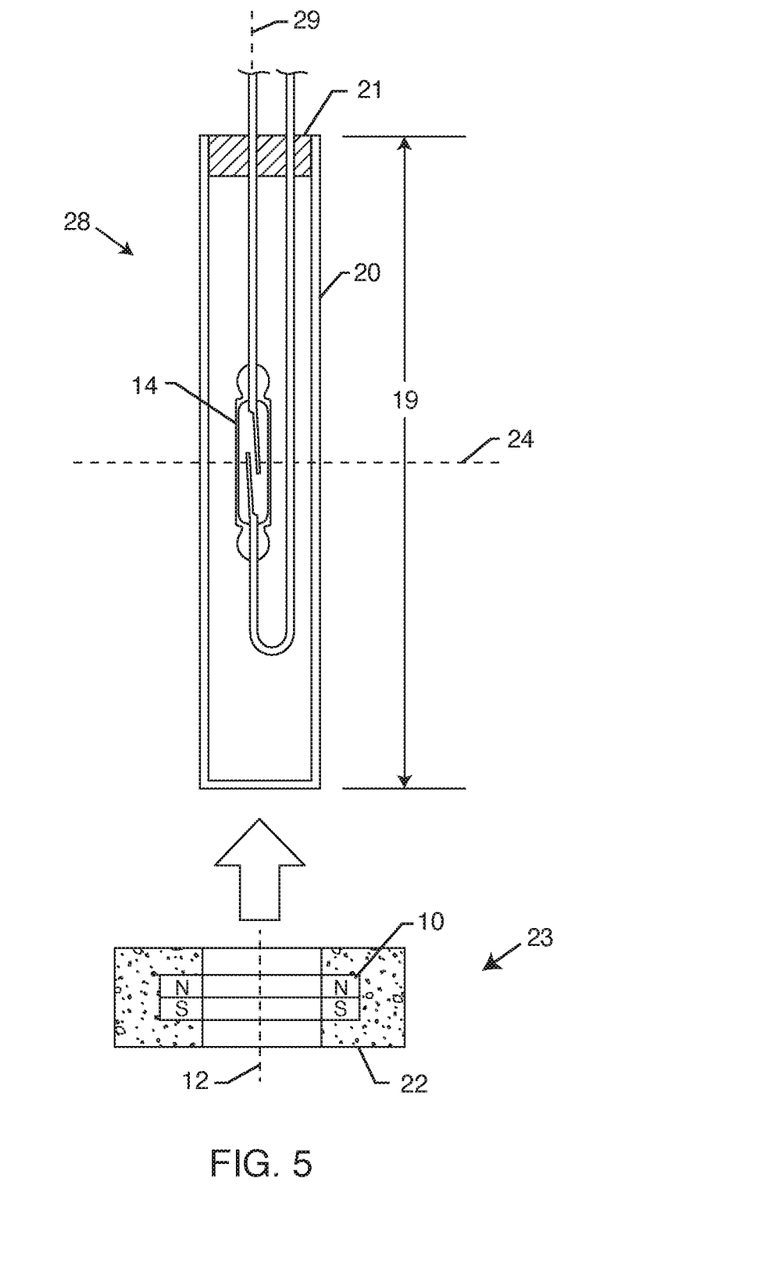
FIG. 5 is a sectional view of a water level switch utilized by the present invention.

Now having an understanding of the operation of a ring magnet and a reed switch, a water level sensor/switch 28 can be created. FIG. 5 is a sectional view of one example of a reed switch 14 aligned with and placed in the center of a longitudinal length 19 of a vertically oriented support 20, which in this embodiment is simply a tube 20. The vertical center of the reed switch is identified at line 24. The tube 20 includes a seal 21 at the top such that water or other contaminates do not interfere in the operation of the reed switch. The cross section of the tube may be circular, oval, square, rectangular, triangular or any other combination thereof such as hexagonal, octagonal or the like. The tube is preferably shaped so the ring magnet 14 can slide freely along the outside of the tube 20. Here, the ring magnet 14 is disposed within a buoyant material 22 to form the float 23. The buoyant material 22 has enough buoyancy to overcome the weight of the ring magnet such that the overall float assembly 23 is buoyant when placed upon water. In practice the tube 20 is stationary in its location as it is attached inside the toilet tank. This then allows the float 23 to move up and down along the tube as the water level goes up and down.

There are many ways of creating this float assembly 23. For example, the ring magnet may be fully molded inside the buoyant material or partially molded inside the buoyant material. The buoyant material may be a plastic shell with an air pocket disposed therein. The buoyant material may be any material or construction that has a lower specific gravity of water such that the overall float assembly 23 has a lower specific gravity of water. As can be appreciated by those skilled in the art, there are a limitless amount of ways the float 23 may be constructed as this teaching is not meant to limit the invention to the specific form taught herein. The float 23 can then be slid over the tube 20 such that the float 23 is free to rise and fall with the level of the water inside a tank, such as a toilet tank.

Figure 6A:
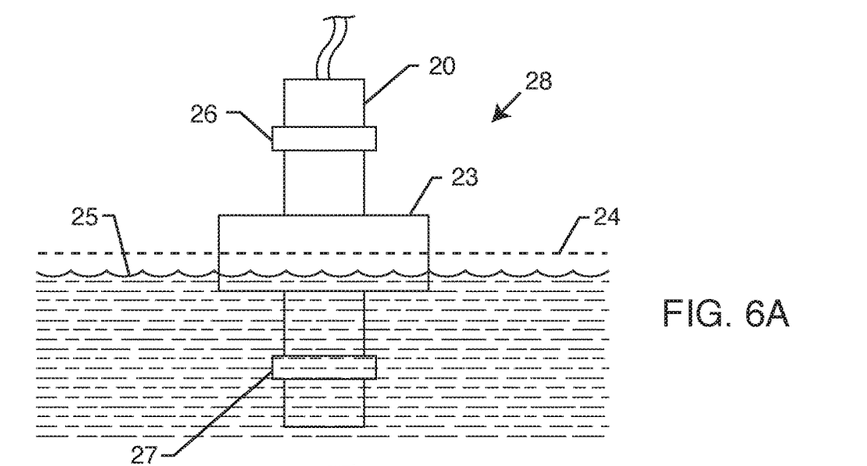
FIG. 6A shows the water level switch of FIG. 5 where the float is not closing the reed switch.

FIG. 6A is a side sectional view showing the tube 20 and float 23 installed within a tank to measure the water level 25. There is an upper stop 26 and a lower stop 27, which may be integrally formed as part of the tube 20 or comprise a separate part attached to the tube 20. The stops prevent the movement of the float if the float goes too high or too low. In FIG. 62 the center of the ring magnet inside the float 23 is aligned with the vertical center 24 of the reed switch. In this situation, the reed switch 14 is still open as there are no magnetic forces causes the reeds to close and make electrical contact.

Figure 6B:
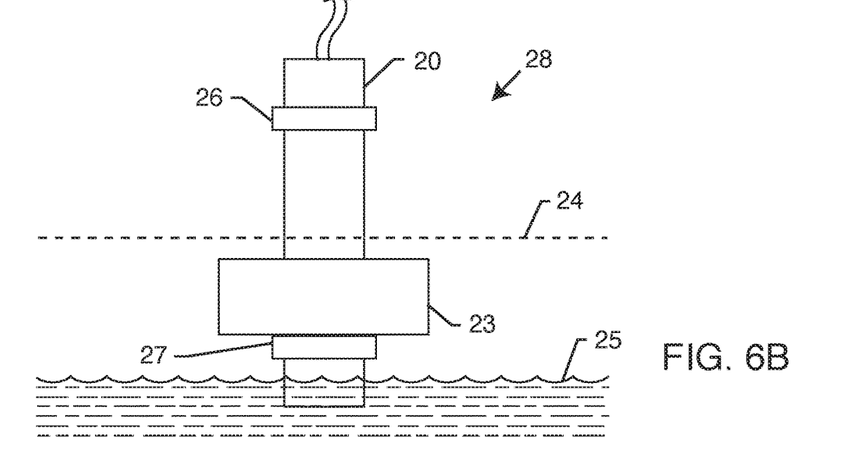
FIG. 6B shows the water level switch of FIG. 5 where the float is lowered and therefore closes the reed switch.

FIG. 6B is similar to FIG. 6A, but now shows the water level 25 has dropped. The lower stop 27 prevents the float 23 from dropping further as the water level 25 continues to drop. The location of the lower stop is placed such that the reed switch is located at a position which changes the magnetic forces on the switch so that the forces upon the reeds of the reed switch to close; for example, position C in FIG. 2 in relation to the ring magnet. The ring magnet therefore now causes the reed switch to close and conduct electrical current.

Figure 6C:
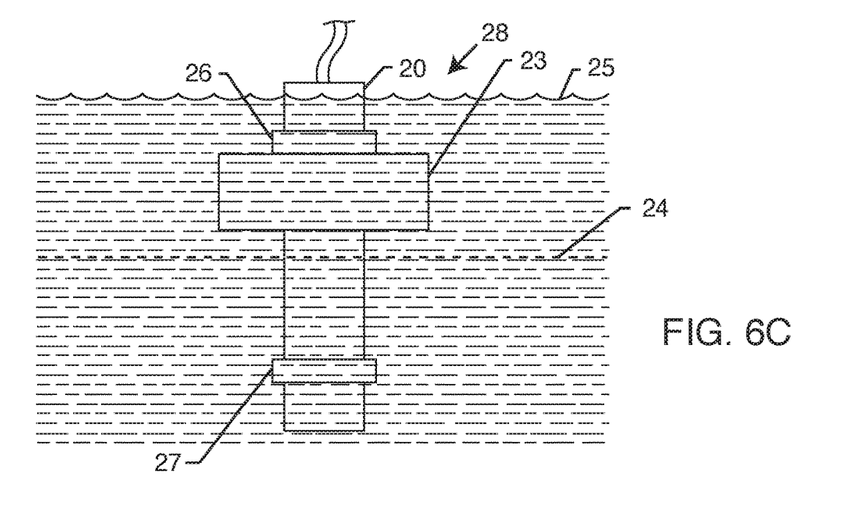
FIG. 6C shows the water level switch of FIG. 5 where the float is raised and therefore closes the reed switch.

FIG. 6C is similar to FIG. 6A and is the opposite situation of FIG. 6B. In FIG. 6C the water level 25 has risen above the upper stop 26 such that the ring magnet once again causes the reed switch to close and conduct electrical current. The upper and lower stops keep the ring magnet in locations which allow for the reed switch is activated.

Figure 7:
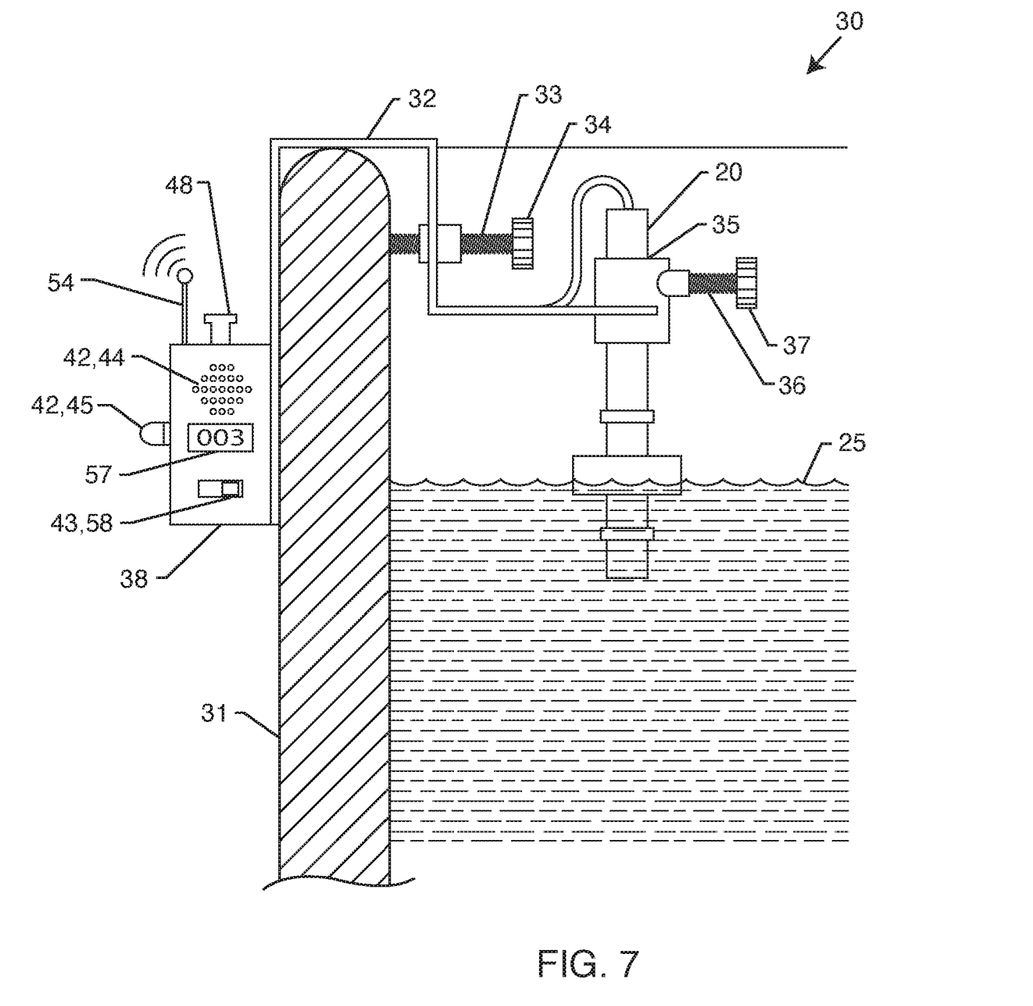
FIG. 7 is a side sectional view through a toilet tank showing the present invention disposed therein.

FIG. 7 is a side sectional view of one embodiment of the present invention being a low power consumption toilet tank leak detection device 30 being installed inside of a toilet tank 31. Here, a support structure 32 is configured to secure the leak detection device 30 relative to the toilet tank. In this embodiment, the support structure 32 is formed as a bracket that hangs over the edge of the toilet tank itself. A screw 33 with a knurled head 34 (or the like) can be used for the user to easily secure the support structure 32 inside the toilet tank. The support structure includes a passageway 35 for the tube 20 to be disposed within. The passageway 35 allows for the tube 20 to be adjusted up and down such that the water level sensor can be positioned correctly during installation of the present invention. A second screw 36 with a knurled head 37 (or the like) can once again be used to secure the tube into its correct position. As can be appreciated by those skilled in the art, there are a multitude of ways the support structure and screws may be configured or used to secure the present invention inside a toilet tank, as this particular teaching is not to be limited to the precise embodiment taught herein. Furthermore, there are a whole range of water level sensors and configurations that can be used consistent with the teaching of this application. For an example of an embodiment not shown, a float can be attached to a lever arm that pivots about a hinge, where the position of the lever arm will either connect or disconnect various electrical devices and operate in a similar manner to teaching herein.

Now referring back to the embodiment shown in FIG. 7, there is a controller 38. The controller 38 may take the form of a box as shown herein or simply be integrated into the support structure 32. Furthermore, the controller 38 may be located outside or inside of the tank depending on the embodiment. The controller may contain the electronic circuit 39 (best shown in FIG. 10) that operates the device. The controller may also contain a timer 40 and a power source 41 such as a battery. While the present invention may use a microprocessor, this particular embodiment does not. The controller may also contain an alarm indicator 42, the alarm indicator taking many forms and variations as discussed further herein.

For facilitating installation of the device, the controller can include a test button 43 that is configured to start or stop an audible (buzzer 44) or visual signal (LED 45) when the float 25 is located at the correct neutral position, that being the vertical center 24 of the reed switch. This makes adjusting the screw 36 very easy as one can determine when the tube 20 has been properly located. Once everything is properly adjusted, the test button 43 can be turned off such that the device resumes its normal operation.

The normal use cycle for a toilet is when it is flushed, meaning the flapper is pulled open. During this cycle the water in the toilet tank drains in the toilet bowl. Depending on the type of toilet and its flush options the tank is either fully or partially emptied. The flapper returns to closed position and toilet fill valve (that resides inside the tank) senses the low level of water in the tank and fills the tank to the preset level which can be considered the full tank level. The water level sensor of the present invention senses what is happening to the water level inside the tank. However, the level switch signal mimics a mechanical switch that is open (not electrically connected) when the float is in the center position (i.e. full tank level) and closed (electrically connected) when the float is either higher or lower that the center position.

Four different tank level positions described below:

1. In a normal use cycle, when the toilet is flushed and water drains from the tank, the level switch senses the lower water level in the tank and the switch will change from an open to closed position activating the electronic circuit and the timer. As the tank fills up to the full position and the toilet fill valve shuts the water to the tank down, the switch will return to open position. If there is any abnormality with the cycle and the timer times out, the solenoid is activated notifying the user and disconnects the circuit to stop current draw. Depending on the type of toilet, the length of this cycle is roughly between twenty seconds to two minutes.

2. If the flapper stays open, the water level will not return to the full tank level and the switch will stay closed, and the circuit times out creating an alarm.

3. If there is a small leak in the tank after the tank fills up to normal level, water will drain slowly and at some point, the level will fall sufficiently for the switch to change to close position activating the electronic circuit and the timer. This will also register a timeout and sound the alarm. The tank will eventually drain to point that the fill valve turns on and fills the tank back up causing the switch to open again. This cycle will continue until the leak is fixed. Depending on the type of leak and toilet, the length of this cycle is usually between three to twenty minutes.

4. A toilet fill valve may malfunction and occasionally may not stop at the desired level. This may then overfill or underfill the toilet tank. In case of an overfill, water will pass through the overfill tube to the toilet bowl. If this happens, the flow switch magnet will reach its upper limit, the level switch will sense the overfill and change to the closed position. In case of an underfill the float will stay rested on the lower stop causing a time out and alarm. These conditions will remain until toilet is flushed.

Figure 8:
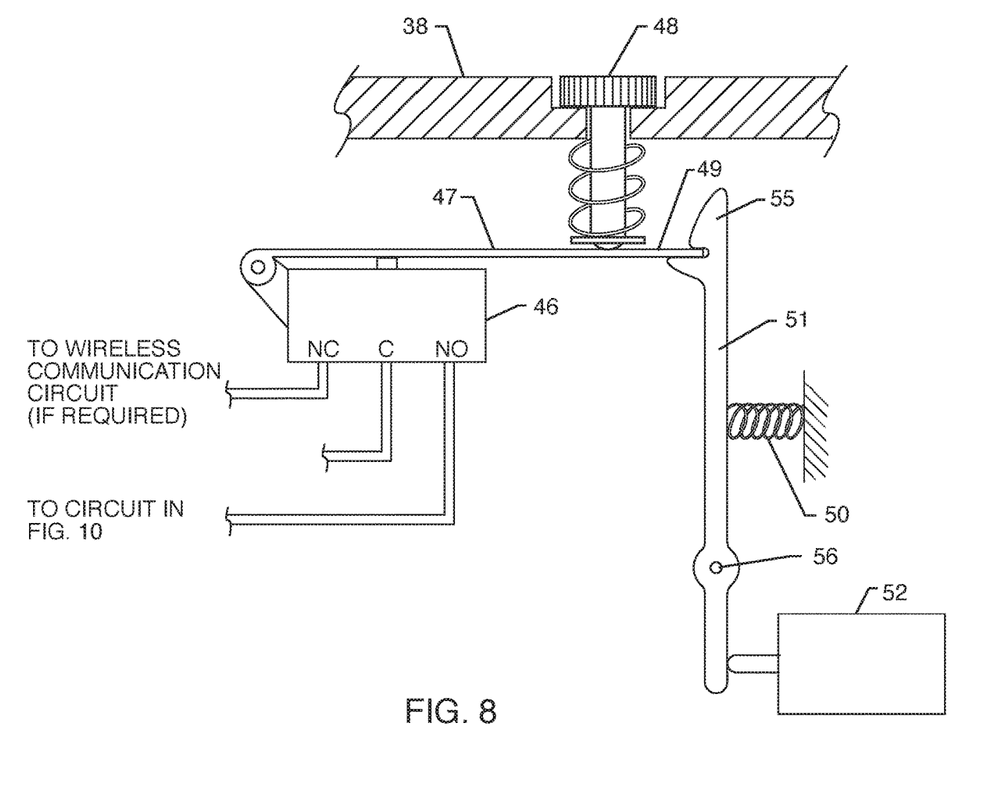
FIG. 8 is a simplified embodiment of an alarm indicator utilized by the present invention.

Referring now to the alarm indicator, there are many embodiments this may take. One such embodiment is shown in FIG. 8 which is just one example of many methods that can be devised. In this example, a microswitch 46 with a lever 47 is used. In this embodiment, the microswitch 46 may have one wire normally closed that can be routed to a wireless communication circuit if required. Another wire can be routed to the circuit as will be shown in FIG. 10. As can be appreciated, there are many variations of microswitches or the like that can be routed to a multitude of variations of electrical circuits that are consistent with this teaching.

Figure 9:
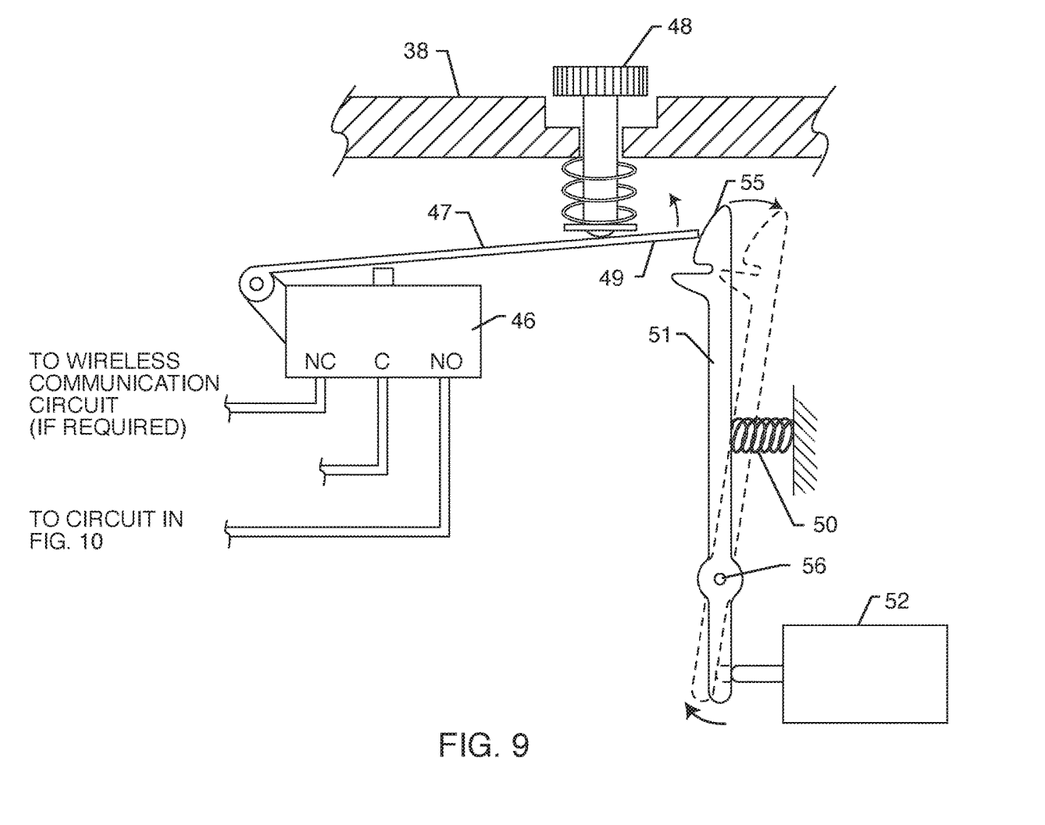
FIG. 9 shows the structure of FIG. 8 now activated.

When the reset button 48 is pressed, one end 49 of the lever 47 latches on a (spring 50 loaded) pivoting latch arm 51 and keeps the microswitch 46 in the reset (closed) position. As can be seen in FIG. 8, the latch arm 51 has an angled head 55 that is configured to catch the lever end 49 when the reset button 48 is depressed. When an alarm condition is detected by the electronic circuit 39, a solenoid 52 activates and moves (pushes) the latch arm to pivot about the hinge 56 forcing the end 49 of the lever 47 out of the latch status. Hence, the switch lever 47 springs up causing the switch 46 to be in an open condition and pushed the reset button 48 up revealing an alarm condition which is shown in FIG. 9. In FIG. 9, the lever arm 51 is also shown in dashed lines to show how it pivots about the hinge 56 to then release the lever 47 so that it may push the reset button 48 upwards.

Figure 10:
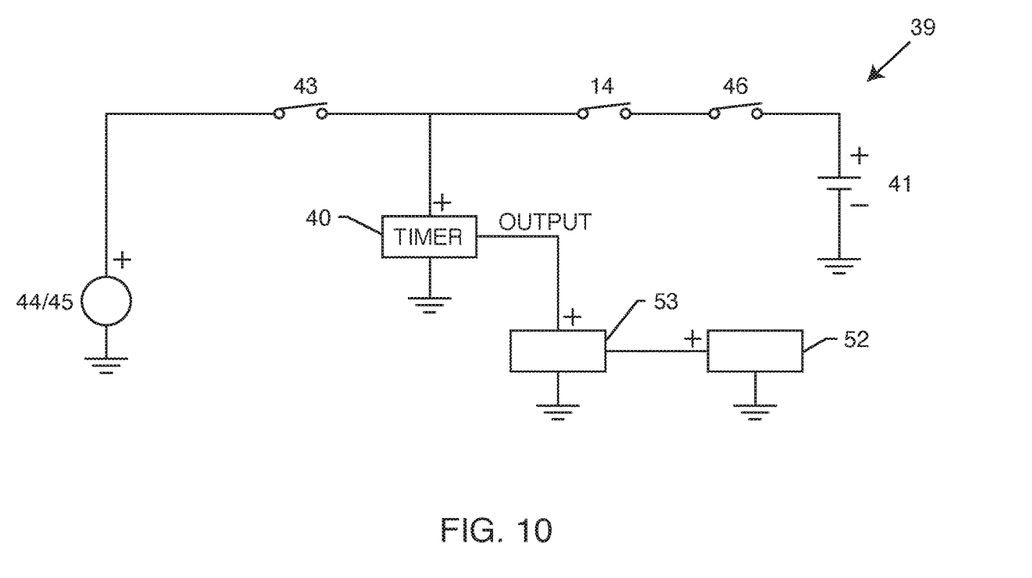
FIG. 10 is an electrical schematic of one embodiment of an electrical circuit utilized by the present invention.

Referring now to the electronic circuit 39, there are many embodiments this may take. One such embodiment is shown in FIG. 10. The electronic circuit includes a simple "delay before on" timer 40. The output of the timer 40 powers the solenoid 52 through a relay or transistor switch 53. The timer 40 is set to activate in a predetermined elapsed time from a power on condition where the predetermined elapsed time is longer than the anticipated time for a flush cycle where the toilet tank will go from a full to flush to full condition. Here, the electronic circuit may be hard wired or powered by solar power, rechargeable batteries and/or regular batteries 41. The power to the electronic circuit passes through the alarm indicator microswitch 46 that is connected in series with the level switch 14. When the alarm indicator is reset and the toilet tank is full the circuit is completely off. In a normal flush cycle, the circuit is powered, the timer starts running but the tank fills in before the timer is triggered and circuit powers off. In case of all three leak types, the recovery time is longer than the predetermined elapsed time and the timer triggers the solenoid and the device shows an alarm condition has been encountered. Simultaneously the circuit is powered off by the microswitch to conserve energy yet again.

As previously discussed, the electrical circuit 39 may also include a test button 43 that is configured to start or stop and audible (buzzer 44) or visual signal (LED 45) when the float 25 is located at the correct neutral position, that being the vertical center 24 of the reed switch. This makes adjusting the screw 36 very easy as one can determine when the tube 20 has been properly located. Once everything is properly adjusted, the test button 43 can be turned off such that the device resumes its normal operation.

Referring back to FIG. 7, a transmitter 54 can be added to communicate the alarm notifications wirelessly. An independent circuit can be added to the device that is powered by the normally closed (NC) pole of the microswitch. This circuit will be off in the reset position and will turn on when the device is in alarm mode. This circuit will disconnect from power when the device is reset.

Also shown in FIG. 7 is a counter 57 that may be added to an embodiment of the present invention. The counter may be an electronic counter such as an LED display or be a mechanical counter that requires no power after activated. The counter 57 is useful as it will indicate how many flush cycles have occurred since the reset button was reset. In this manner, one can quickly see if the flush count is substantially high such that this could indicate another problem exists. For example, there may be situations where the toilet will flush and cycle to fill the tank correctly, but then shortly thereafter another flush cycle may be initiated due to some problem. Over time, the toilet may keep flushing over and over such that much water is wasted. In the embodiment described, the counter would help identify if such a problem was occurring. An additional reset button 58 could be added to reset the counter itself.

In another embodiment not shown, one magnet may be used that is part of the float such that the one magnet either activates or deactivates the reed switch. Alternatively, the magnet may not be ring shaped, but could be cube shaped, cylindrically shaped or any other suitable shape as is known to those skilled in the art. Alternatively, a multitude of magnets of could be used disposed within a single float, such that some magnets were disposed below the water line and some above the water line. As can be appreciated, there a range of magnets and a range of reed switches that may be used consistent with the teaching of this application.

In another embodiment not shown, multiple reed switches could be used at varying longitudinal distances (i.e. heights) to provide a diagnostic feedback. For example, as the float changes position it could actuate other reed switches to indicate the water level and associated potential faults, especially if coupled with a microprocessor and timer.

In another embodiment, a Hall Effect sensor could be used. This would allow the device to not only detect the water level but also the direction and/or velocity of the magnetic ring's travel and could provide insight as to whether there is a leak due to the tank not filling, leaking slowly, or overfilling.

This Detailed Description merely describes exemplary embodiments of the invention and is not intended to limit the scope of the claims in any way. Indeed, the invention as claimed is broader than and unlimited by the embodiments shown herein, and the terms used in the claims have their full ordinary meaning. For example, while exemplary embodiments described in this disclosure relate to the design and use of a low power consumption toilet leak detection device, it is to be understood that one or more of the features described herein may additionally or alternatively be applied to other water system or to other fluid systems, such as, for example, natural gas, air, propane, steam, oil, gas, or other such fluid systems. Furthermore, it is understood that a fluid can be comprised of air, steam, gas, liquid or any combinations thereof.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Parameters identified as "approximate" or "about" a specified value in the claims are intended to include both the specified value and values within 10% of the specified value, unless expressly stated otherwise. Further, it is to be understood that the drawings accompanying the present disclosure may, but need not, be to scale, and therefore may be understood as teaching various ratios and proportions evident in the drawings. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

"Computer," "control module," or "processor" as used herein includes, but is not limited to, any programmed or programmable electronic device or coordinated devices that can store, retrieve, and process data and may be a processing unit or in a distributed processing configuration. Examples of processors include microprocessors, microcontrollers, graphics processing units (GPUs), floating point units (FPUs), reduced instruction set computing (RISC) processors, digital signal processors (DSPs), field programmable gate arrays (FPGAs), etc. Computer devices herein can have any of various configurations, such as handheld computers (e.g., so-called smart phones), pad computers, tablet laptop computers, desktop computers, and other configurations, and including other form factors. The various computers and processors herein have logic for performing the various corresponding functions and processes described herein. "Logic," synonymous with "circuit" as used herein includes, but is not limited to, hardware, firmware, software and/or combinations of each to perform one or more functions or actions. For example, based on a desired application or needs, logic may include a software controlled processor, discrete logic such as an application specific integrated circuit (ASIC), programmed logic device, or other processor. Logic may also be fully embodied as software. "Software," as used herein, includes but is not limited to one or more computer readable and/or executable instructions that cause a processor or other electronic device to perform functions, actions, processes, and/or behave in a desired manner. The instructions may be embodied in various forms such as routines, algorithms, modules or programs including separate applications or code from dynamically linked libraries (DLLs). Software may also be implemented in various forms such as a stand-alone program, a web-based program, a function call, a subroutine, a servlet, an application, an app, an applet (e.g., a Java applet), a plug-in, instructions stored in a memory, part of an operating system, or other type of executable instructions or interpreted instructions from which executable instructions are created. It will be appreciated by one of ordinary skill in the art that the form of software is dependent on, for example, requirements of a desired application, the environment it runs on, and/or the desires of a designer/programmer or the like. In exemplary embodiments, some or all of the software is stored on memory, which includes one or more non-transitory computer readable media of one or more local or remote data storage devices. As used herein, "data storage device" means a device for non-transitory storage of code or data, e.g., a device with a non-transitory computer readable medium. As used herein, "non-transitory computer readable medium" mean any suitable non-transitory computer readable medium for storing code or data, such as a magnetic medium, e.g., fixed disks in external hard drives, fixed disks in internal hard drives, and flexible disks; an optical medium, e.g., CD disk, DVD disk, and other media, e.g., RAM, ROM, PROM, EPROM, EEPROM, flash PROM, external flash memory drives, etc. Communication circuits herein include antennas and/or data ports and driver chips for sending and receiving communications with other devices. In exemplary embodiment, communication circuits can include any one or more of Wi-Fi antennas and circuitry, LTE antennas and circuitry, GPS antennas and circuitry, CDPD antennas and circuitry, GPRS antennas and circuitry, GSM antennas and circuitry, UMTS antennas and circuitry, Ethernet circuitry, and other antennas and circuitry, USB ports and circuitry (e.g., standard, micro, mini, etc.), RS-232 ports and circuitry, proprietary ports and circuitry (e.g., APPLE 30 pin and Lightning ports), RFID antennas and circuitry, NFC antennas and circuitry, bump technology antennas and circuitry, a Bluetooth (e.g., BLE) antenna and circuitry, DOCSIS circuitry, ONT circuitry, and other antennas, ports, and circuitry.

As described herein, when one or more components are described as being connected, joined, affixed, coupled, attached, or otherwise interconnected, such interconnection may be direct as between the components or may be indirect such as through the use of one or more intermediary components. Also, as described herein, reference to a "member," "component," or "portion" shall not be limited to a single structural member, component, or element but can include an assembly of components, members or elements.

Although several embodiments have been described in detail for purposes of illustration, various modifications may be made to each without departing from the scope and spirit of the invention. Accordingly, the invention is not to be limited, except as by the appended claims.

NUMERALS 10 ring magnet, axially magnetized
11 ring magnet, diametrically magnetized
12 central axis, ring magnet
N north-pole
S south-pole
Ri inside radius, ring magnet
Ro outside radius, ring magnet
T thickness, ring magnet
A location
B location
C location
D location
14 reed switch
15 glass capsule
16 insert gas
17 overlap
18 reed blades
19 longitudinal length
20 vertically oriented support, tube
21 seal
22 buoyant material
23 float
24 vertical center, reed switch
25 water level
26 upper stop
27 lower stop
28 water level switch/sensor
29 longitudinal axis, reed switch
30 low power consumption toilet tank leak detection device
31 toilet tank
32 support structure/bracket
33 screw
34 knurled head
35 passageway
36 screw
37 knurled head
38 controller
39 electronic circuit
40 timer
41 power source, battery
42 alarm indicator
43 test button
44 buzzer, audible alarm
45 LED
46 microswitch
47 lever
48 reset button
49 one end, lever
50 spring
51 latch arm
52 solenoid
53 relay or transistor switch
54 transmitter
55 angled head
56 hinge
57 counter
58 counter reset button

What is claimed is:
1. A leak detection device for a toilet tank, comprising:
a water level switch configured to be disposed within the toilet tank, wherein the water level switch comprises a float configured to be buoyant when placed upon a water source, and wherein the float is configured to at least partially move with a water level within the toilet tank from a beginning position to a first non-beginning position, the first non-beginning position being lower or higher in relation to the beginning position;

an electronic circuit electrically connected to the water level switch, the electronic circuit including a power source and a timer;

wherein the electronic circuit is configured to be electrically disconnected from the power source when the water level switch is at the beginning position;

wherein the electronic circuit is configured to be electrically connected to the power source when the water level switch is at the first non-beginning position; and wherein the timer is configured to be activated when the water level switch is at the first non-beginning position, wherein the timer includes a preset time limit, wherein if the preset time limit is reached or exceeded the electronic circuit is configured to send an alarm signal to an alarm indicator.

2. The leak detection device of claim 1, further including a support structure, wherein the support structure includes the water level switch and is formed as or includes a bracket, the bracket configured to secure the leak detection device to the toilet tank or to an overflow tube inside the toilet tank.

3. The leak detection device of claim 1, wherein the timer includes a second preset time limit, wherein if the second preset time limit is reached and/or exceeded the electronic circuit is configured to disconnect from the power source, wherein the second preset time limit starts when the first preset time limit is reached and/or exceeded.

4. The leak detection device of claim 1, including the alarm indicator which is attached to the support structure.

5. The leak detection device of claim 4, wherein the alarm indicator is configured to be disposed at least partially outside the toilet tank, wherein the alarm indicator includes a visual alarm, wherein the visual alarm comprises an LED and/or wherein the visual alarm comprises a mechanical display configured to remain displayed even when the power source is disconnected from the electronic circuit.

6. The leak detection device of claim 4, wherein the alarm indicator comprises a speaker configured to sound an audible alarm.

7. The leak detection device of claim 4, wherein the alarm indicator comprises a transmitter, wherein the transmitter is configured to receive the alarm signal and send a wireless alarm signal to an electronic device.

8. The leak detection device of claim 7, wherein the alarm indicator is configured to be disposed within the toilet tank.

9. The leak detection device of claim 1, wherein the power source includes a battery.

10. The leak detection device of claim 1, wherein the water level switch comprises a vertically oriented support including a reed switch having a longitudinal axis aligned along a longitudinal length of the vertically oriented support, wherein the float is movable up and down along the vertically oriented support, wherein the float comprises a ring magnet, the ring magnet comprising a north pole ring portion abutting a south pole ring portion, wherein a central axis of the ring magnet is aligned with the longitudinal axis of the reed switch.

11. The leak detection device of claim 10, wherein the vertically oriented support includes a lower stop configured to prevent the float from moving below the lower stop when the water level within the toilet tank drops further below, wherein the float abutting the lower stop is located at the first non-beginning position.

12. The leak detection device of claim 10, wherein the float is configured to at least partially move with the water level within the toilet tank from the beginning position to a second non-beginning position, the second non-beginning position being higher in relation to the beginning position.

13. The leak detection device of claim 12, wherein the vertically oriented support includes a higher stop configured to prevent the float from moving above the higher stop when the water level within the toilet tanks rises further above, wherein the float abutting the higher stop is located at the second non-beginning position.

14. The leak detection device of claim 10, wherein the vertically oriented support is adjustable up and down in relation to the support structure.

15. The leak detection device of claim 1, wherein the electronic circuit includes a counter, the counter configured to display how many times the leak detection device was activated.

16. The leak detection device of claim 15, wherein the counter includes a counter reset button, the counter reset button configured to reset the counter back to a starting count when activated.

17. The leak detection device of claim 1, wherein the leak detection device does not include a microprocessor.

18. A leak detection device for a fluid tank, comprising:
a support structure configured to secure the leak detection device relative to the toilet tank, the support structure including a fluid level switch;

wherein the fluid level switch comprises a float configured to be buoyant when placed upon a fluid source, and wherein the float is configured to at least partially move with a fluid level within the fluid tank from a beginning position to a first non-beginning position, the first non-beginning position being lower or higher in relation to the beginning position, wherein the float comprises a ring magnet, the ring magnet comprising a north pole ring portion abutting a south pole ring portion;

an electronic circuit including a power source and a timer, wherein the electronic circuit is in electrical communication with the fluid level switch;

wherein the electronic circuit is configured to be electrically disconnected from the power source when the fluid level switch is at the beginning position;

wherein a magnetic field created by the ring magnet causes the fluid level switch to enter a closed state when the float is at the first non-beginning position so that the electronic circuit is connected to the power source; and wherein the timer is configured to be activated when the fluid level switch is at the first non-beginning position, wherein the timer includes a preset time limit, wherein if the preset time limit is reached or exceeded the electronic circuit is configured to send an alarm signal to an alarm indicator.

19. A leak detection device for a toilet tank, comprising:
a support structure configured to secure the leak detection device relative to the toilet tank;

a water level switch attached to the support structure configured to be disposed within the toilet tank, wherein the water level switch comprises a float configured to be buoyant when placed upon a water source, and wherein the float is configured to float upon and at least partially move with a water level within the toilet tank from a beginning position to a first non-beginning position, the first non-beginning position being lower or higher in relation to the beginning position;

an electronic circuit attached to the support structure, the electronic circuit including a power source and a timer, wherein the electronic circuit is in electrical communication with the water level switch;

an alarm indicator in electrical communication with the electronic circuit;

wherein the electronic circuit is configured to be electrically disconnected from the power source when the water level switch is at the beginning position;

wherein the electronic circuit is configured to be electrically connected to the power source when the water level switch is at the first non-beginning position;

wherein the timer is configured to be activated when the water level switch is at the first non-beginning position, wherein the timer includes a preset time limit, wherein if the preset time limit is reached or exceeded, the electronic circuit is configured to send an alarm signal to the alarm indicator; and wherein the alarm indicator is attached to the support structure outside the toilet tank, wherein the alarm indicator includes a visual display showing the alarm signal was sent, wherein the visual display is configured to remain displayed after the power source is disconnected from the electronic circuit.

20. The leak detection device of claim 19, wherein the water level switch comprises a vertically oriented support including a reed switch having a longitudinal axis aligned along a longitudinal length of the vertically oriented support, wherein the float is movable up and down along the vertically oriented support, wherein the float comprises a ring magnet, the ring magnet comprising a north pole ring portion abutting a south pole ring portion, wherein a central axis of the ring magnet is aligned with the longitudinal axis of the reed switch, wherein the vertically oriented support includes:

a lower stop configured to prevent the float from moving below the lower stop when the water level within the toilet tank drops further below, wherein the float abutting the lower stop is located at the first non-beginning position; or a higher stop configured to prevent the float from moving above the higher stop when the water level within the toilet tanks rises further above, wherein the float abutting the higher stop is located at the first non-beginning position.

* * * * *